US009049615B2

(12) United States Patent
Chuang

(10) Patent No.: US 9,049,615 B2
(45) Date of Patent: *Jun. 2, 2015

(54) METHOD OF CONTROLLING MINIMIZATION OF DRIVE TESTS

(71) Applicant: ACER INCORPORATED, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 138 days.

This patent is subject to a terminal disclaimer.

(21) Appl. No.: 13/685,687

(22) Filed: Nov. 26, 2012

(65) Prior Publication Data

US 2013/0203358 A1     Aug. 8, 2013

Related U.S. Application Data

(60) Provisional application No. 61/595,157, filed on Feb. 6, 2012.

(30) Foreign Application Priority Data

Mar. 23, 2012    (TW) .............................. 101110126 A

(51) Int. Cl.
*H04B 17/00* (2006.01)
*H04W 24/04* (2009.01)
*H04W 24/10* (2009.01)

(52) U.S. Cl.
CPC .............. *H04W 24/04* (2013.01); *H04W 24/10* (2013.01)

(58) Field of Classification Search
CPC .................................................. H04W 24/08
USPC ........................ 455/67.11, 424, 458
See application file for complete search history.

(56) References Cited

U.S. PATENT DOCUMENTS

| 8,553,563 | B2* | 10/2013 | Suzuki et al. ................. 370/252 |
| 2008/0182594 | A1* | 7/2008 | Flore et al. .................... 455/458 |
| 2011/0250893 | A1 | 10/2011 | Lee |
| 2012/0044822 | A1* | 2/2012 | Kim et al. ..................... 370/252 |
| 2012/0108199 | A1 | 5/2012 | Wang et al. |

FOREIGN PATENT DOCUMENTS

TW            201204079            1/2012

OTHER PUBLICATIONS

Samsung, "Procedure for logged MDT in idle", 3GPP TSG RAN WG2 #69bis R2-102292 (Apr. 16, 2010), p. 1-3.
Samsung, "Idle mode MDT measurements, flows", 3GPP TSG-RAN2#70 bis meeting R2-103790 (Jul. 2, 2010).
Ericsson, Alcatel-Lucent, Nokia Siemens Networks, ZTE, pCR to shadow TS 32.422 for MDT, "Use of paging for configuring logged MDT", 3GPP TSG-SA5 Meeting SA5#74 S5-103261(Nov. 19, 2010).

* cited by examiner

*Primary Examiner* — Tuan H Nguyen
(74) *Attorney, Agent, or Firm* — Winston Hsu; Scott Margo

(57) ABSTRACT

A user equipment is configured to operate in an idle mode according to an MDT configuration. When receiving a modify/setup signal from a base station, the user equipment is configured to update the MDT configuration accordingly in the idle mode and perform one or multiple corresponding logged MDTs according to the updated MDT configuration.

6 Claims, 2 Drawing Sheets

METHOD OF CONTROLLING MINIMIZATION OF DRIVE TESTS

CROSS REFERENCE TO RELATED APPLICATIONS

This application claims priority of U.S. Patent Application No. 61/595,157 filed on 2012 Feb. 6, which is included in its entirety herein by reference.

BACKGROUND OF THE INVENTION

1. Field of the Invention

The present invention is related to a method of controlling minimization of drive test, and more particularly, to a method of modifying or setting minimization of drive test in the idle mode.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple base stations, commonly known as Node-Bs (NBs), for communicating with multiple user equipments (UEs). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

NBs of the wireless communication system must be deployed properly in order to provide seamless, high quality and large signal coverage without experiencing call drops or signal degradation. However, planning and optimizing the deployment of the NBs are based on signal quality measurements which may be time- and effort-consuming for an operator of the wireless communication system. Common methods of performing the measurements include measuring the signal strength or quality at different time and geographical locations of interest. Therefore, it is more economical for a UE of the wireless communication to perform the measurements and send the measurement report to a NB. Based on the measurement reports received from multiple UEs, the deployment of the NBs may be planned and optimized accordingly without spending many human and material resources. For such measurements, minimization of drive tests (MDTs) which include immediate MDT and logged MDT are defined in corresponding 3GPP specifications.

A UE is configured to perform an immediate MDT in a connected mode, in which reference signal received power (RSRP), reference signal received quality (RSRQ), power headroom (PH), uplink signal strength, or signal to interference and noise ratio (SINR) may be measured. The UE may report the measurement results to a NB serving the UE when a report condition is satisfied.

In order to perform a logged MDT, a UE is configured to receive a logged measurement configuration message from the NB in the connected mode. The logged measurement configuration message is associated with an MDT configuration which includes measurement duration, measurement interval or measurement parameter. After entering an idle mode, the UE is configured to perform a logged MDT according to the logged measurement configuration message and store the measurement result. When the measurement length or the amount of the measurement data exceed a predetermined value, the UE stops performing the logged MDT and sends the measurement result to the NB after switching to the connected mode.

In the prior art when a UE is operating in the idle mode according to a logged measurement configuration message, if the network requests to modify or set the MDT configuration for some reason, the UE needs to switch to the connected mode for receiving the corresponding instruction from the network. In other words, the NB is unable to directly control the operation of the UE in the idle mode. The UE is constantly required to switch between the connected mode and the idled mode, which may consume more power and waste network resources.

SUMMARY OF THE INVENTION

The present invention further provides a method of controlling MDT. The method includes a user equipment operating in an idle mode according to an MDT configuration; the user equipment updating the MDT configuration in the idle mode by modifying corresponding parameters according to a modify signal received from a base station; and the user equipment performing one or multiple specific logged MDTs in the idle mode according to the updated MDT configuration.

The present invention further provides a method of controlling MDT. The method includes a user equipment operating in an idle mode according to an MDT configuration; the user equipment updating the MDT configuration in the idle mode by setting corresponding parameters according to a setup signal received from a base station; and the user equipment performing one or multiple specific logged MDTs in the idle mode according to the updated MDT configuration.

These and other objectives of the present invention will no doubt become obvious to those of ordinary skill in the art after reading the following detailed description of the preferred embodiment that is illustrated in the various figures and drawings.

DETAILED DESCRIPTION

For a UE and a base station in a wireless communication system, the present invention provides a method of controlling a logged MDT in the idle mode. The UE may directly modify or set the MDT configuration in the idle mode according to messages received from the base station without switching to the connected mode. In the present invention, the wireless communication system may be a UMTS or an LTE system which includes a network and multiple UEs in a simplified embodiment. In the UMTS, the network may be a UTRAN including a plurality of NBs. In the LTE system, the network may be an E-UTRAN including a plurality of eNBs. The UE may be a mobile phone, a laptop computer, a tablet computer, an e-book or any portable computer system. However, the above examples are merely embodiments and do not limit the scope of the present invention.

Figure 1:
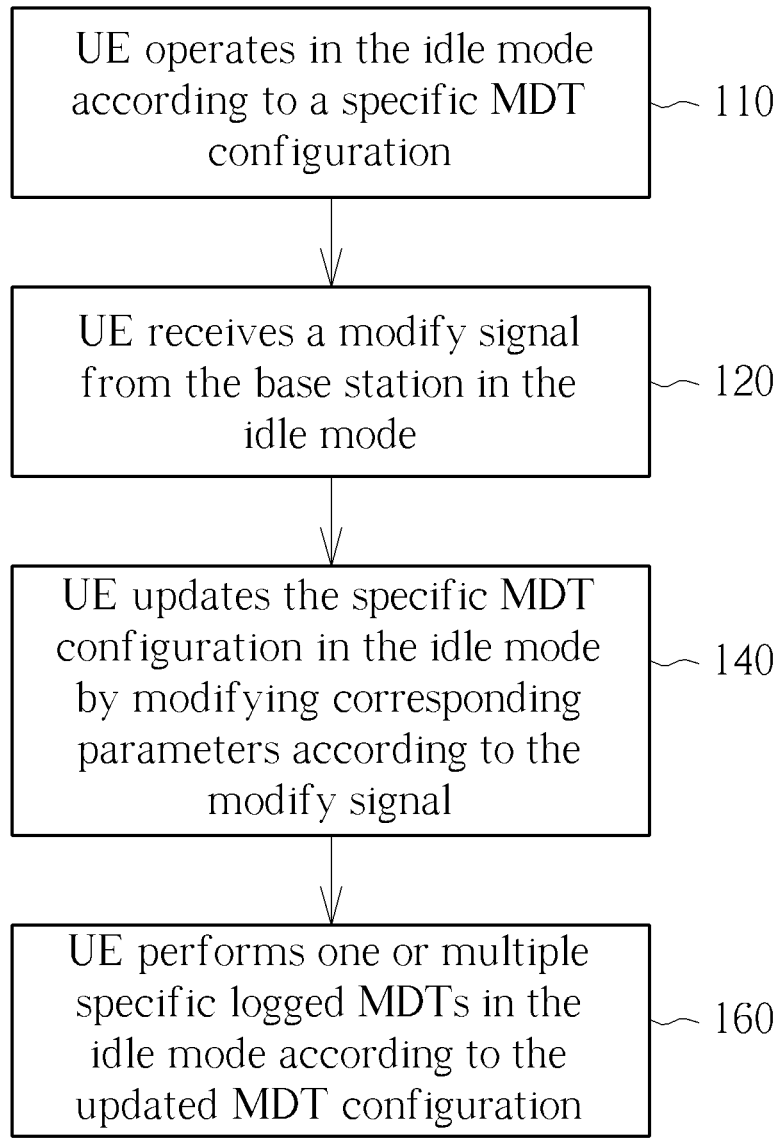
FIGS. 1 and 2 are flowcharts illustrating methods of modifying logged MDT in the idle mode according to embodiments of the present invention.

FIG. 1 is a flowchart illustrating a method of modifying logged MDT in the idle mode according to a first embodiment of the present invention. The flowchart in FIG. 1 includes the following steps:

Step 110: UE operates in the idle mode according to a specific MDT configuration.

Step 120: UE receives a modify signal from the base station in the idle mode.

Step 140: UE updates the specific MDT configuration in the idle mode by modifying corresponding parameters according to the modify signal.

Step 160: UE performs one or multiple specific logged MDTs in the idle mode according to the updated specific MDT configuration.

Figure 2:
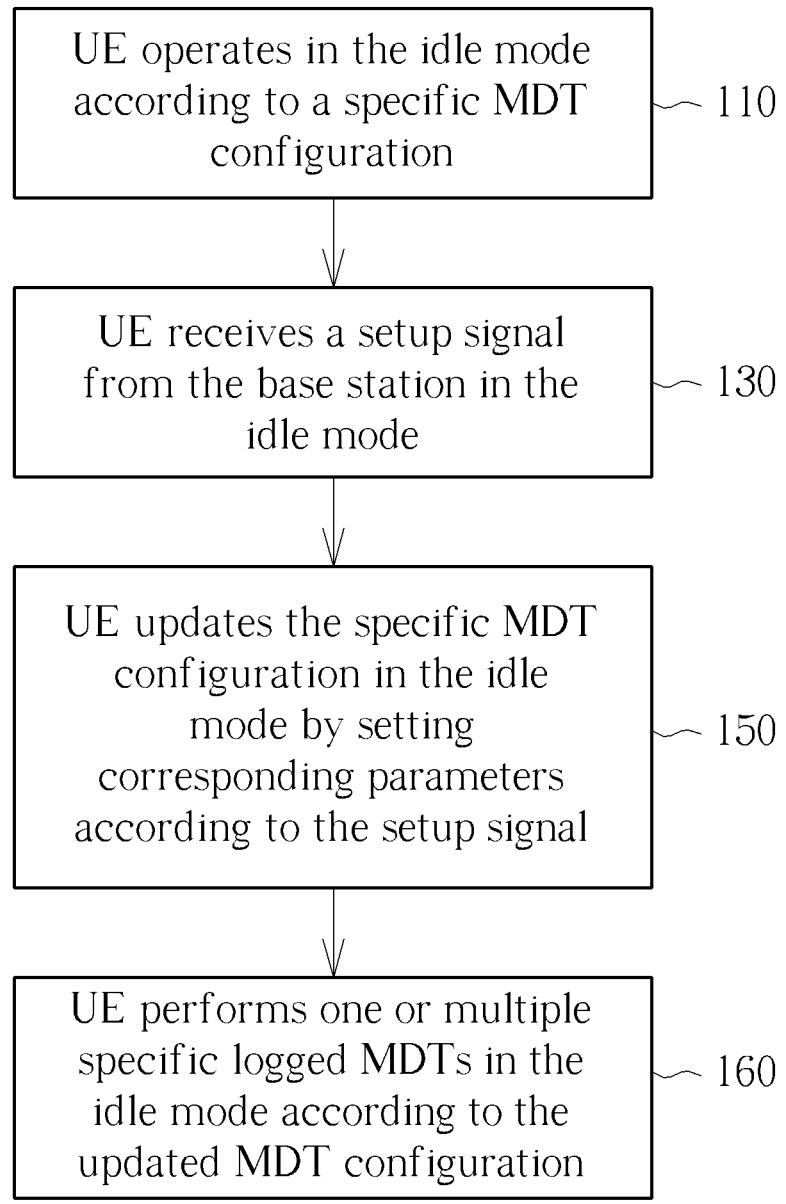

FIG. 2 is a flowchart illustrating a method of modifying logged MDT in the idle mode according to a second embodiment of the present invention. The flowchart in FIG. 2 includes the following steps:

Step 110: UE operates in the idle mode according to a specific MDT configuration.

Step 130: UE receives a setup signal from the base station in the idle mode.

Step 150: UE updates the specific MDT configuration in the idle mode by setting corresponding parameters according to the setup signal.

Step 160: UE performs one or multiple specific logged MDTs in the idle mode according to the updated specific MDT configuration.

When the UE is the connected mode before executing step 110, the base station may send a logged measurement configuration message which is associated with the specific MDT configuration. In step 110, the UE may operate in the idle mode according to the logged measurement configuration message, such as performing one or multiple logged MDTs.

In step 120, the base station may send the modify signal to the UE if the network has requested the UE to change one or multiple logged MDTs for some reason, such as for measuring other parameters of the current base station. In step 130, the base station may send the setup signal to the UE if the network has requested the UE to add one or multiple logged MDTs for some reason, such as for collecting data from other base stations.

According to corresponding 3GPP specifications (such as Rel-10 TS 37.320), the base station may send a paging message via a paging control channel (PCCH) to the UE when operating in the idle mode. The paging message may include information such as CN domain indicator, UE identification, paging range and paging cause. In the embodiment of the present invention, the modify signal may be an over-the-air (OTA) paging message with a paging cause "modify logged MDT" which may indicate the change of one or multiple specific logged MDTs. Similarly, the setup signal may be an OTA paging message with a paging cause "set logged MDT" which may indicate the setup of one or multiple specific logged MDTs.

According to corresponding 3GPP specifications (such as Rel-10 TS 37.320), the base station may send a logged measurement configuration message to the UE when operating in the connected mode. The logged measurement configuration message may include MDT configuration such as measurement duration, measurement interval or measurement parameter. In the embodiment of the present invention, the modify signal may be an OTA logged measurement configuration message with specific parameters set to be associated with the change of one or multiple specific logged MDTs. Similarly, the setup signal may be an OTA logged measurement configuration message with specific parameters set to be associated with the setup of one or multiple specific logged MDTs.

In step 140, the UE is configured to update the specific MDT configuration in the idle mode by modifying corresponding parameters according to the modify signal. In step 150, the UE is configured to update the specific MDT configuration in the idle mode by setting corresponding parameters according to the setup signal. In step 160, the UE is configured to perform one or multiple specific logged MDTs in the idle mode according to the updated specific MDT configuration.

In the present invention, the UE may directly update the specific MDT configuration in the idle mode, and then perform one or multiple specific logged MDTs according to the updated MDT configuration. Since the UE may update the specific MDT configuration in the idle mode without switching to the connected mode, the present invention is advantageous in lowering power consumption and economizing network resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling minimization of drive test (MDT), comprising:
   a user equipment receiving a logged measurement configuration message associated with an MDT configuration from a base station in a connected mode;
   the user equipment operating in an idle mode according to the MDT configuration after switching from the connected mode to the idle mode;
   the base station requesting the user equipment to change one or multiple specific logged MDTs which are to be performed according to the MDT configuration by sending a modify signal;
   the user equipment updating the MDT configuration in the idle mode by modifying corresponding parameters according to the modify signal after receiving the modify signal in the idle mode and before switching from the idle mode to the connected mode; and
   the user equipment performing the one or multiple specific logged MDTs in the idle mode according to the updated MDT configuration after updating the MDT configuration and before switching from the idle mode to the connected mode.

2. The method of claim 1, wherein the modify signal is a paging message received from the base station via a paging control channel (PCCH) and a paging cause of the paging message is associated with changing the one or multiple specific logged MDTs.

3. The method of claim 1, wherein:
   the modify signal is an over-the-air (OTA) logged measurement configuration message received by the user equipment in the idle mode; and
   the modify signal includes settings for changing the one or multiple specific logged MDTs.

4. A method of controlling MDT, comprising:
   a user equipment receiving a logged measurement configuration message associated with an MDT configuration from a base station in a connected mode;
   the user equipment operating in an idle mode according to the MDT configuration after switching from the connected mode to the idle mode;

the base station requesting the user equipment to add one or multiple specific logged MDTs which are not to be performed according to the MDT configuration by sending a setup signal;

the user equipment updating the MDT configuration in the idle mode by setting corresponding parameters according to the setup signal after receiving the setup signal in the idle mode and before switching from the idle mode to the connected mode; and the user equipment performing the one or multiple specific logged MDTs in the idle mode according to the updated MDT configuration after updating the MDT configuration and before switching from the idle mode to the connected mode.

5. The method of claim 4, wherein the setup signal is a paging message received from the base station via a PCCH and a paging cause of the paging message is associated with adding the one or multiple specific logged MDTs.

6. The method of claim 4, wherein:

the setup signal is an over-the-air (OTA) logged measurement configuration message received by the user equipment in the idle mode; and the setup signal includes settings for adding the one or multiple specific logged MDTs.

* * * * *